Figure 1:
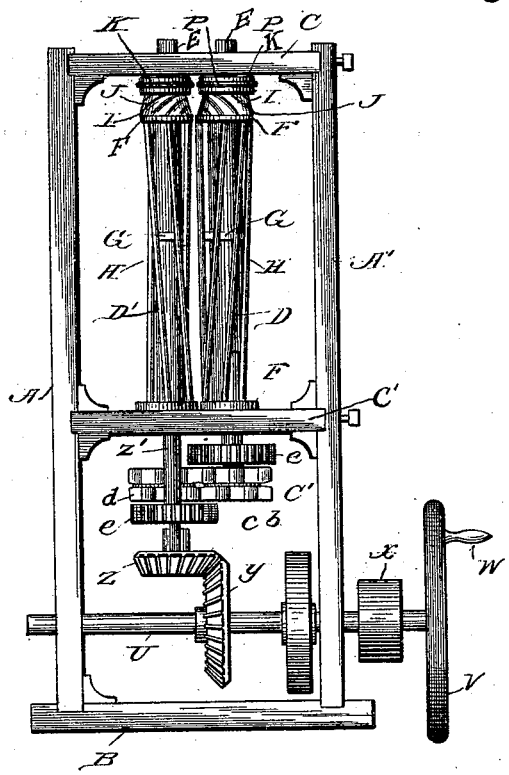

(No Model.) 3 Sheets—Sheet 1.

B. A. BEARDSLEY.
HOP PICKING MACHINE.

No. 503,190. Patented Aug. 15, 1893.

Witnesses:
J. W. Fowler Jr.
John G. Hood

Inventor:
Backus A. Beardsley
By F. R. Harding
Attorney (No Model.)  3 Sheets—Sheet 2.

B. A. BEARDSLEY.
HOP PICKING MACHINE.

No. 503,190. Patented Aug. 15, 1893.

Witnesses:
J. N. Fowler Jr
John G. Wood

Inventor:
Backus A. Beardsley.
By F. R. Harding
Attorney.

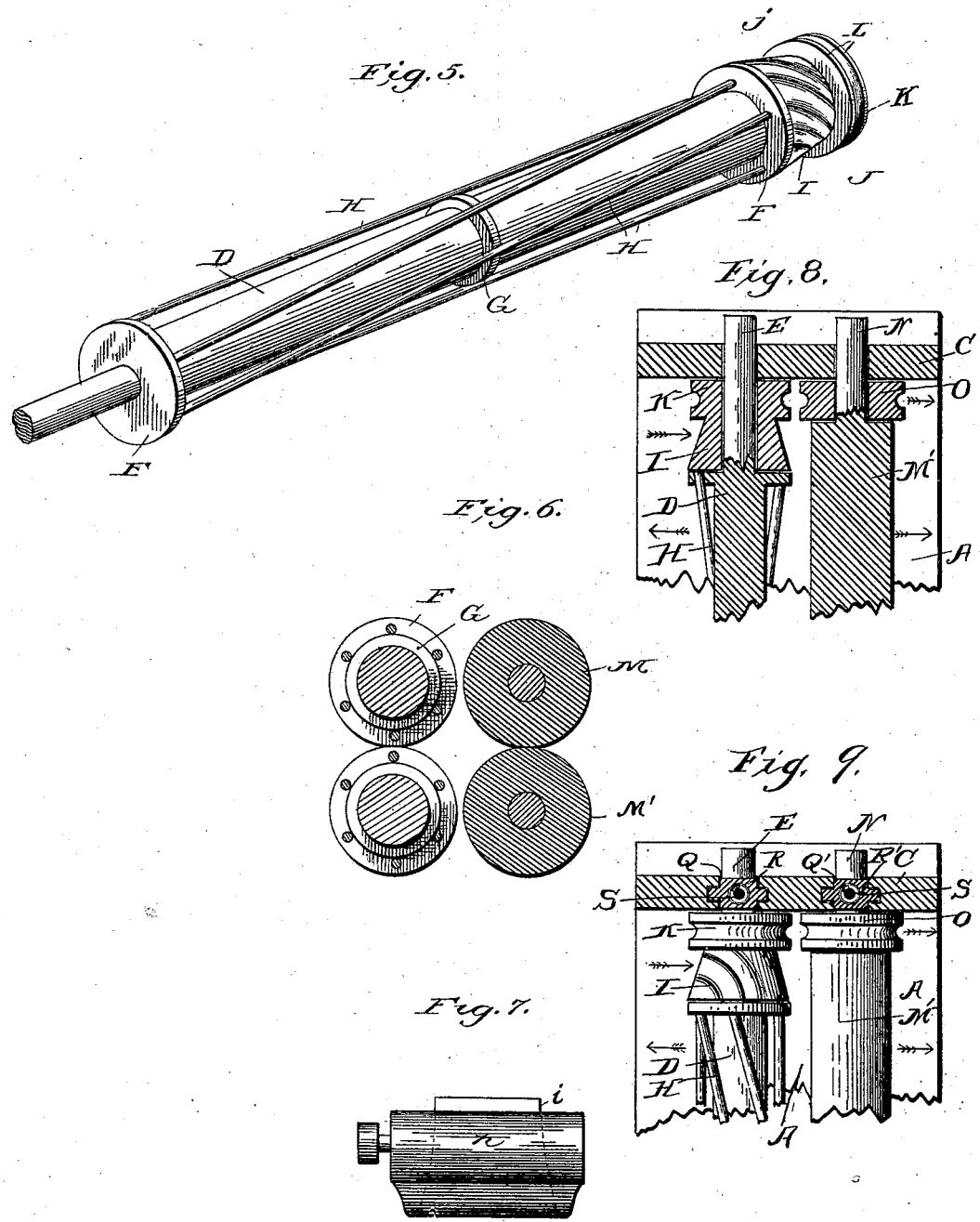

UNITED STATES PATENT OFFICE.

BACKUS A. BEARDSLEY, OF WATERVILLE, NEW YORK.

HOP-PICKING MACHINE.

SPECIFICATION forming part of Letters Patent No. 503,190, dated August 15, 1893.

Application filed November 12, 1892. Serial No. 451,735. (No model.)

*To all whom it may concern:*

Be it known that I, BACKUS A. BEARDSLEY, a citizen of the United States, residing at Waterville, in the county of Oneida and State of New York, have invented certain new and useful Improvements in Hop-Picking Machines; and I do hereby declare the following to be a full, clear, and exact description of the invention, such as will enable others skilled in the art to which it appertains to make and use the same.

My invention relates to that class known as "hop-pickers;" and more particularly refers to a new and useful improvement on machines designed for this purpose.

As is well known, hop-picking is an expensive, and laborious proceeding arising from the limited time or season allowed wherein to harvest the crop and transport the same to an available market; the unreliability and scarcity of the required manual labor; the tedium of the operation of picking each hop or flower from the vine or branch; and last but most important, the attendant expense of the wages and maintenance of a large force of hands. All this presents serious obstacles and constitutes objectionable features which I contemplate entirely obviating and eradicating by the use of my invention.

It is the essential object of this invention to produce a construction of a hop-picking machine which will strip the hops from the vine or branch without marring or injuring them in the least and in a rapid and thorough manner; moreover, to provide a machine which shall be simple and serviceable in construction and operation, durable in use, accessible in all its parts, and comparatively inexpensive in first cost and subsequent maintenance.

Other objects and advantages of my improvement will appear hereinafter.

For the attainment of these several objects, my invention consists, essentially, of a novel form of stripping and feeding mechanism whereby the vine or branch to be stripped is instantly caught from the hand of the operator and rapidly fed and stripped in its passage through the machine; the hops and accompanying leaves dropping upon a separator in front of the machine while the vines or branches or both are delivered to the rear.

My invention comprises further certain other auxiliary and co-operating features, details of construction, arrangement and combination of parts, all of which will be more fully described hereinafter, and the specific points of novelty in which will be particularly designated by the appended claims.

In the accompanying drawings I have shown sufficient means for successfully carrying out my invention in practice; however, I wish to here state and distinctly emphasize that I am not confined to the exact construction shown and described, since many obvious changes, variations, and departures may be made without deviating from the spirit and scope of my invention as defined and set forth by the claims.

Figure 2:
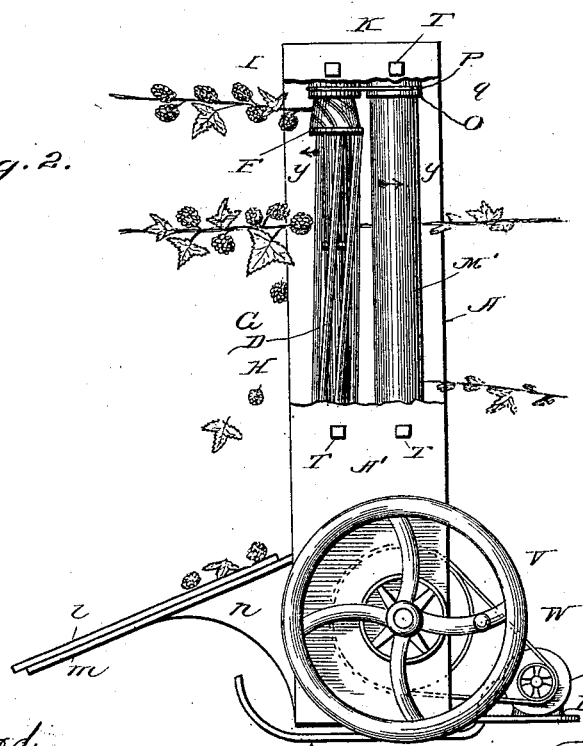
Figure 3:
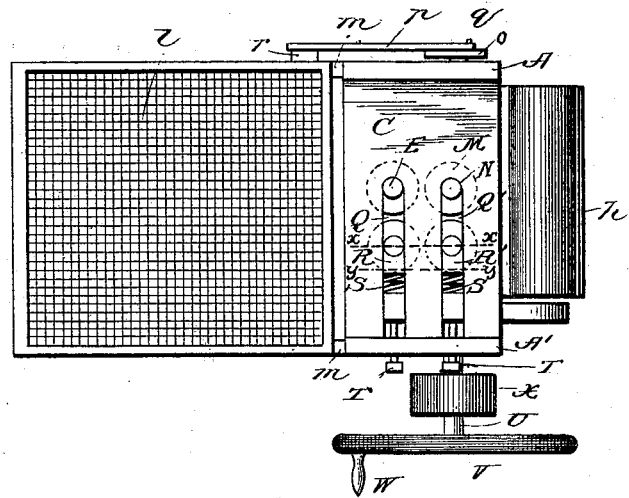
Figure 4:
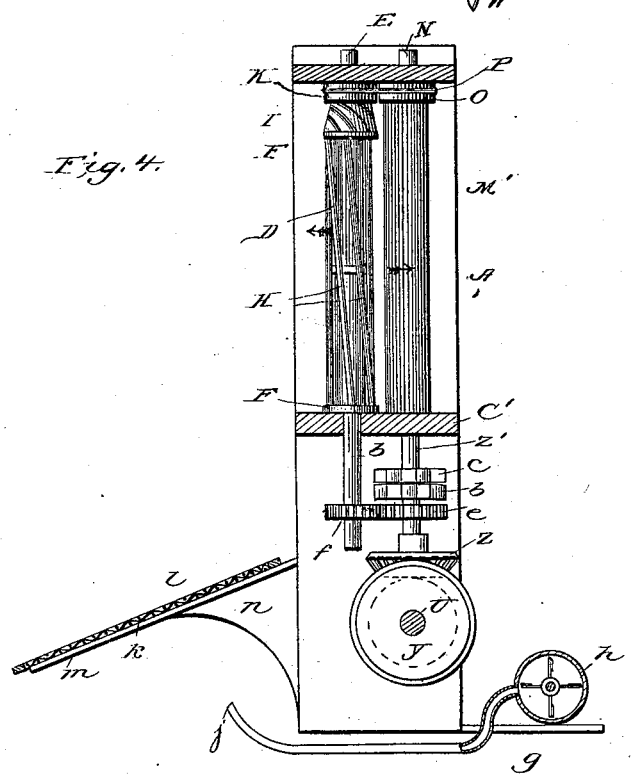

Referring to the drawings forming a component part hereof:—Figure 1 is a front elevation of the hop-picking machine with the separator detached in order to more clearly illustrate the power mechanism and gearing. Fig. 2 is a side elevation of the complete invention, one portion of a side-plate of the frame being broken away to show arrangement and construction of the feeding and stripping rolls. In this figure several branches of hops are shown in different positions between the operating rolls whereby a clearer idea of actual operation may be had. Fig. 3 is a top plan view of Fig. 2. Fig. 4 is a central longitudinal section of Fig. 1. Fig. 5 is a detail perspective view of one of the picker-rolls. Fig. 6 is a transverse horizontal section taken centrally across through the picker and withdrawing rolls. Fig. 7 is a rear detail elevation showing the fan-blower with its discharge spout or pipe in operative relation to the vibratory separator to blow off the leaves in their descent upon the separator with the hops. Fig. 8 is an enlarged detail section on line $x$—$x$ of Fig. 3. Fig. 9 is a similar view on line $y$—$y$ of Fig. 3.

Like letters of reference mark the same or corresponding parts in all the several views of the drawings.

The frame work of the machine is formed of any suitable material such as wood or metal of the desired shape, strength, and configuration to accommodate and support the various parts attached to the same; consequently, its form and arrangement may be changed at will to suit special requirements since it forms no salient feature of the invention. As shown, it is substantially rectangular in outline comprising the rectangular side-plates, A, A', one on each side of the machine mortised, bolted, or otherwise fastened to the transverse rectangular base-plate, B, at the lower extremity, and at the upper end to a top connecting plate, C. The base-plate, B, is extended rearwardly some distance farther than the width of the side plates to provide a support for the fan-blower secured thereon and described hereinafter. Intermediate of the base and top plates is bearing-plate C' serving to support the lower ends of the picking and feed-rolls and also acting as a supplementary brace and transverse support for the side-plates, thus giving additional strength and rigidity to the frame-work. This entire framework may be supported in an elevated position by legs or other supporting medium (not shown) or may be furnished with suitable handles or other devices to make the machine portable from place to place.

D, D', are the picker or stripping rolls, each made of suitable material, preferably cast iron, forming a solid roll of the required length and diameter for the purposes to be subserved. From each extremity projects a short stud shaft, E, either cast integral with the roll or constituting the terminal projections of a longitudinal shaft passing clear through the center of each roll having a longitudinal central circular bore to permit insertion of said shaft. Either of these constructions may be employed; however, the cheaper and more practical method is to cast short stud-shafts on the end of each picker roll. On the squared off plane end of each picker roll is a circular plate or disk, F, having a central circular opening whereby the same can be slipped on over the adjacent stud-shaft. These disks can be fastened on the shaft or end of the roll in any suitable or approved manner or may be cast integral with the roll or shaft, as the case may be; there being one disk at each end of the roll of greater diameter than the roll itself. Midway of the length of each roll is a peripheral circular flange or collar, G, projecting at right-angles therefrom and of slightly less diameter than the disks F. Such flange or collar is preferably cast in one piece with the roll. Lengthwise of each roll and serially disposed therearound are a number of spirally disposed picker ribs or rods H, H, and are arranged around the surface of the roll in a spiral manner, each rib or rod extending obliquely across the face of its roll. Each picker-rod extends across the face of its roll in a plane that would intersect any axial plane of the roll at an angle. Strictly speaking, none of the picker-rods are exactly straight in that they are slightly bowed or curved to their oblique disposal across the face of each roll and their consequent conformation to the curvature of the arc through which they severally extend, yet, notwithstanding such inappreciable curvature of the picker-rods, it is a fact that each one occupies a true plane which would intersect any axial plane of the roll at an angle. These ribs or rods may be of cast or wrought iron, preferably the latter, comparatively small in diameter or cross-section, and have perfectly smooth rounded surfaces; being severally fixed at their respective extremities to the disks, F, F, in suitable perforations around the edges of the disks; said perforations being equi-distant from the center of its disk. The central point of each picker-rod is stayed and supported against too much elasticity or play by the flange or collar, G, abutting against the under side of each rod, H, as shown clearly in Fig. 5.

From the foregoing description it will be understood that there are two rolls carrying picker-rods placed opposite each other and arranged for co-operation in a manner fully explained hereinafter.

On the upper end of each picker-roll, adjacent to a disk, F, and on the stud-shaft, is loosely mounted a conical clamping roll, I, having a roughened or serrated surface formed by spiral grooves or depressions, J, J, running from the base of the cone to the apex thereof in a sinuous or spiral manner; said grooves or depressions serving to catch, hold, and feed the end of the branch or vine inserted by the operator between the contiguous rotating surfaces of the two conical rolls. Each grooved roll, I, is made of some soft metal so that it can be readily grooved or roughened. In the present instance, I shall describe the same as made of Babbitt metal. Integral with and at the upper end of each roll, I, is formed a grooved pulley or sheave, K, made by two parallel peripheral ribs, L, L, and in the groove thus formed runs a friction-band for communicating rotary motion to the adjacent feed-roll. The withdrawing-rolls, M, M', are arranged in pairs similar to the picker-rolls and in line with the latter so that the opening between the adjacent surface of the picker-rolls is in the same vertical plane as the line of contact of the withdrawing-rolls. They are made of some yielding, pliable, and elastic material, such as rubber; and the rubber can be in the form of a facing for the rolls or the latter can be molded entirely of rubber, as desired. At each end of each withdrawing-roll is a stud-shaft, N, similar in size, length, and arrangement to those of the picker rolls; and also at each extremity of a withdrawing roll, adjacent to the squared off plane ends thereof, is a metal-sheave or pulley, O, corresponding to the opposite pulley, K, of the picker-rolls. Thus, a picker and withdrawing roll are run in unison by a friction-band, P, fitted over the pulleys, K, and O.

In the top or connecting-plate, C, of the frame are cut two elongated parallel slots, Q, Q', running from one side plate, A' to a point beyond the center of the connecting-plate;

the walls of each slot having formed therein at opposite points lateral recesses to receive and hold the corresponding projections on the sides, of the movable journal-bearings, R, R', which severally move along in said slots. The inner end of each bearing, R, R', is concave as shown to conform to the curvature of the adjacent stud-shaft, while the outer or opposite end is provided with a circular bore or recess extending centrally and longitudinally within the bearing some distance. In the bore is placed a spiral compression-spring, S, adapted to be compressed by the action of the set-screw, T, passing through a screw-threaded aperture in the side-plate, A'. By this construction each bearing is rendered adjustable to vary the relation of the withdrawing-rolls and picker-rolls, and to render them elastic and yielding according to the size and bulk of the branch or vine passed through the machine. Thus, there is one picker-roll and one withdrawing-roll provided with an adjustable yielding bearing, the other two opposite rolls being maintained in place against the end of the slots, Q, Q', by the juxtaposition of the opposite movable rolls and the impact of their bearings. The lower ends of the picker-roll, D', and the withdrawing-roll, M', are similarly adjustably journaled in the supplementary cross-plate, C'.

U designates the main or driving-shaft journaled in the side plates, A, A' and extending transversely underneath the cross-plate, C''. One end of this shaft is extended beyond the side-plate, A', and to this extension is keyed the fly-wheel, V, having a crank-handle, W, by which hand-power is imparted to the main-shaft. Instead of the hand-wheel, power can be communicated to the main-shaft by the pulley, X, keyed thereon and receiving rotary motion from a belt run by a motor of any suitable type (not shown). Approximately midway of the main-shaft is a king or bevel-gear wheel, Y, intermeshing with a bevel pinion, Z, on the stud-shaft, Z', fixed to the withdrawing-roll M. Motion is communicated to the picker-roll, D, by a cog-wheel e on the stud-shaft, Z', above the bevel pinion, Z, and intermeshing with the pinion, a, on the elongated lower end of the stud-shaft of the picker-roll, D. The withdrawing-roll, M', is actuated by means of a peculiar form of gear, b, having elongated eccentric teeth, c, and intermeshing with a gear, d, of similar construction on the protruding end of the stud-shaft at the lower end of withdrawing-roll, M. The gear, d, is keyed on the stud-shaft, Z', above the cog wheel, before described. The opposite withdrawing-roll, M, is run at the same rate of speed as the roll, M'. The picker-roll, D', receives rotary motion from the withdrawing-roll, M', by means of a gear, e, on the stud-shaft of the roll, M', intermeshing with a pinion, f, on the stud-shaft of roll, D. Thus, it will be apparent that the withdrawing-rolls are run at a different and slower rate of speed than the picker-rolls, and that by reason of the peculiar formation of the gears, b, and d, provision is made for mutual expansion and contraction of the withdrawing-rolls necessary to accommodate different sizes of vines and branches being operated upon. The withdrawing-rolls also travel in a different or opposite direction to the picker-rolls; and furthermore, the clamping-rolls, I, I, operate in the same direction as the withdrawing-rolls, but in an opposite direction to the picker-rolls.

I do not confine myself to any specific arrangement or form of gearing, since the same can be varied, and interchanged at will in accordance with the result desired and the mechanical skill of the manufacturer.

Upon a supplementary base, g, constituting an extension of the base-plate, B, as before stated, is located a fan-blower, h, of any approved or desired form operated by a belt and pulley from the main-shaft, as shown, and having a curved discharge-tube or spout, i, as wide at the base as the width of the blower and contracted at its mouth somewhat to concentrate and increase the force of the discharged air-currents. The mouth, j, of this discharge pipe, terminates under a separator, k, for the purpose of blowing off the leaves falling down from the picker rolls upon the separator. This separator consists simply of an inclined foraminous sieve or riddle, l, supported and longitudinally movably in guide-ways, m, m, on the brackets, n, n, and having a vibratory or reciprocatory motion imparted to it by means of an eccentric disk, o, on the end of the main-shaft, and a connecting-rod, p, pivotally attached to a crank-pin, q, on the disk at one end, and at the other extremity jointed loosely to a lug, r, supporting the separator. By this means any and all of the falling hops are agitated and fall through the openings in the sieve down into some suitable receptacle.

I have found that by the provision of a separator constructed and operated in this manner in connection with an air-blast apparatus, the hops will be delivered into the receptacle in a cleanly condition unmixed with leaves and other débris; however, it is obvious that other forms of separators and air-blast apparatus may be employed without departing from the novelty of this invention,—in fact, these features may be dispensed with altogether, if desirable.

In operation, the branch or vine is inserted by the operator between the rotating clamping rollers, I, I, by which it is instantly caught and carried downwardly into position between the picker-rods, which latter are rotating in unison approaching each other at their nearest points in pairs, as illustrated in Fig. 1. As any two rods of opposite picker-rolls arrive opposite each other, their adjacent surfaces are nearer together at their tops than at their bottoms, while the two rods or pair of rods following closely behind such nearest pair are gradually assuming the last described relative position. On the other hand, the pair that have just passed the point of nearest approach are widening at their tops and contracting at their lower extremities. Thus, it will be understood that these several different positions of the picker-rods serve to force the branch or vine downwardly between the picker-rolls, and simultaneously subject the hops upon said branch to a stripping or pulling action resembling closely that of the fingers of the hand. This function of the pickers is the fundamental novel principle of my invention, and without close scrutiny will not be readily appreciated. Contemporaneously with the picking action of the rolls, D, D', the withdrawing-rolls are traveling in an opposite direction and are pulling between them the portion of the branch or vine already acted upon by the picker rolls. The action of the machine being very rapid constant feed on the part of the operator is required. As the hops are detached in the manner just described, they fall vertically upon the vibrating separator, and are forced by the action thereof to pass through the interstices formed between the intersecting wires composing the bottom of the same into the bag or other receptacle underneath. Under ordinary conditions the leaves upon the branches or vines will pass edgewise through the picker and feed rolls and thus not mixing with the detached hops, but sometimes it happens either by reason of the matted condition or irregularity of the leaves that some of them are detached with the hops and fall down into the separator with the same. In such event the force of the air-blast from the discharge mouth of the pipe from the fan-blower will blow off the accompanying leaves since they are lighter in weight and consequently fall more slowly than the hops.

It will be obvious to those skilled in this art that any number of pairs of picking and withdrawing-rolls with such necessary additional duplication of auxiliary and co-operating parts can be arranged within one machine, making the latter of increased capacity and capable of employing additional operators. Again, it is clear, that the picker-rolls and feeding mechanism may be disposed in a horizontal instead of vertical manner by a slight change in the gearing.

My invention can be utilized for other purposes than that described, such for example as the stripping of clover-heads, or other vegetable production carrying similar pods or heads.

Having thus fully described my invention, what I claim, and desire to secure by Letters Patent, is—

1. A hop-picking machine comprising suitable feeding and stripping mechanism; the latter consisting of a pair of rotary rolls, each having projecting stripping surfaces, each of which extends across the face of the roll in a plane intersecting any axial plane of the roll at an angle, substantially as specified.

2. A hop-picking machine comprising suitable feeding and stripping mechanism; the latter consisting of a pair of rotary rolls, each having projecting stripping surfaces spirally disposed around the roll, and each stripping surface extending across the face of its roll in a plane intersecting any axial plane of the roll at an angle, substantially as specified.

3. A hop-picking machine comprising suitable feeding and stripping mechanism; the latter consisting of a pair of rotary rolls, each having rounded projecting stripping surfaces, and each rounded stripping surface extending across the face of the roll in a plane intersecting any axial plane of the roll at an angle, substantially as specified.

4. A hop-picking machine comprising suitable feeding and stripping mechanism; the latter consisting of two oppositely situated co-operating rolls, each having its stripping surface composed of a series of ribs or rods supported around the roll, and each rib or rod lying in a plane intersecting any axial plane of the roll at an angle, substantially as specified.

5. A hop-picking machine comprising suitable feeding and stripping mechanism; the latter consisting of a pair of rolls, each having a series of spirally disposed rods or ribs arranged around the same, and out of contact with the surface of the roll, substantially as specified.

6. A hop-picking machine comprising suitable feeding and stripping mechanism; the latter consisting of a pair of co-operating stripping rolls, each having a series of stripping rods or ribs severally disposed obliquely across the face of the roll, substantially as specified.

7. In a hop-picking machine, the combination, with each stripping roll having a flange at both ends of greater diameter than the roll,—of a series of stripping ribs or rods secured at their extremities respectively to said flanges, and extending across the face of the roll obliquely,—and means for feeding and actuating said rolls, substantially as specified.

8. In a hop-picking machine, the combination, with a stripping roll having a flange at both ends and one midway its length,—of a series of ribs or rods secured severally at their extremities to said flanges at the ends of the roll, and stayed at their central points by the intermediate flange, substantially as specified.

9. In a hop-picking machine, the combination, with a pair of stripping rolls,—and suitable feed mechanism therefor,—of a roughened clamping roll on one extremity of each stripping roll, substantially as specified.

10. In a hop-picking machine, the combination, with a pair of stripping rolls,—and suitable feed mechanism therefor,—of a roughened clamping roll on one extremity of each stripping roll, and capable of traveling in a direction opposite to its corresponding stripping roll, substantially as specified.

11. In a hop-picking machine, the combination, with suitable stripping and withdrawing rolls adapted to travel in opposite directions,—of a clamping roll on one extremity of each stripping roll, and mechanically connected to the withdrawing rolls, substantially as specified.

12. A hop-picking machine comprising a pair of rotary stripping rolls,—a clamping roll on one extremity of each stripping roll,—and a pair of withdrawing rolls in operative relation to the said stripping rolls, substantially as specified.

13. A hop-picking machine comprising a pair of rotary stripping rolls,—a clamping roll on one end of each stripping roll and independently rotatable with relation to its stripping roll,—a pair of rotary withdrawing rolls,—and a motion-transmitting-connection between the clamping and withdrawing rolls, substantially as specified.

14. A hop-picking machine comprising a pair of elastically journaled stripping rolls, each carrying a number of spirally disposed ribs or rods,—a pair of elastically journaled withdrawing rolls in operative relation to said stripping rolls,—and means for actuating both pair of rolls, substantially as specified.

In testimony whereof I affix my signature in presence of two witnesses.

BACKUS A. BEARDSLEY.

Witnesses:
DANL. W. HEWETT,
E. E. HUNTER.